United States Patent
Lin et al.

(10) Patent No.: US 10,691,116 B2
(45) Date of Patent: Jun. 23, 2020

(54) INTELLIGENT PROCESSING MODULATION SYSTEM AND METHOD

(71) Applicant: Chi-Hung Lin, New Taipei (TW)

(72) Inventors: Chi-Hung Lin, New Taipei (TW); Chien-Lung Hsu, Taoyuan (TW); Wei-Cheng Wei, Taoyuan (TW)

(73) Assignee: Chi-Hung Lin, New Taipei (TW)

( * ) Notice: Subject to any disclaimer, the term of this patent is extended or adjusted under 35 U.S.C. 154(b) by 289 days.

(21) Appl. No.: 15/936,483

(22) Filed: Mar. 27, 2018

(65) Prior Publication Data

US 2018/0284740 A1    Oct. 4, 2018

(30) Foreign Application Priority Data

Mar. 31, 2017    (TW) .............................. 106111272 A

(51) Int. Cl.
   *G06F 11/30*    (2006.01)
   *G05B 19/418*    (2006.01)

(52) U.S. Cl.
   CPC .................. *G05B 19/41875* (2013.01); *G05B 2219/31314* (2013.01); *G05B 2219/32018* (2013.01); *G05B 2219/32179* (2013.01); *G05B 2219/32368* (2013.01); *G05B 2219/35217* (2013.01); *Y02P 90/02* (2015.11)

(58) Field of Classification Search
   CPC ................................................ G05B 19/41875
   See application file for complete search history.

(56) References Cited

U.S. PATENT DOCUMENTS

| 8,781,882 B1* | 7/2014 | Arboletti ............ G06Q 10/0639 705/7.39 |
| 2014/0195034 A1* | 7/2014 | Tang .................... G05B 19/418 700/147 |

* cited by examiner

*Primary Examiner* — Phuong Huynh
(74) *Attorney, Agent, or Firm* — Wang Law Firm, Inc.

(57) ABSTRACT

An intelligent processing modulation system comprises: a detector detecting the condition of the processing equipment before the process for processing a raw material into a product begins; a data storage recording the information of the product; a basic database storing the information of the detector and the data storage corresponding to the product and the condition of the product for each time the process is completed; a mode database receiving the information of the detector, the data storage and the basic database and setting up the processing model; a processing equipment operating according to the parameters of the processing model received by the processing information manager; a processing information manager modifying the processing model promptly according to the result of the product in order to improve the yield rate of the product.

10 Claims, 4 Drawing Sheets

INTELLIGENT PROCESSING MODULATION SYSTEM AND METHOD

CROSS-REFERENCE TO RELATED APPLICATION

This application claims priority from Taiwan Application No. 106111272, filed on Mar. 31, 2017, in the Taiwan Intellectual Property Office, the content of which is hereby incorporated by reference in their entirety for all purposes.

BACKGROUND OF THE INVENTION

Field of the Invention

The present invention relates to a processing system and method, especially relates to an intelligent processing modulation system and method.

Description of the Related Art

The modern commercial market continues with its urgent need for products, especially electronic products. In turn, this generates the need for manufactured products, which in turn, are affected by important factors, namely productivity, and yield rate as well. An automated system provides substantial increases to productivity, but has a significant drawback. If, due to incorrect processing parameters, the defects are not found immediately, products which have too many defects may be repeatedly produced.

A database and stop system was hence devised by clever inventors to avoid the massive manufacture of defective products. This new step allowed for breakthrough improvements to yield rate. These improvements brought about new disadvantages however, in the form of labor and time costs, as engineers and machine operators were required to set new parameters and restart the processing equipment manually.

SUMMARY OF THE INVENTION

In view of the aforementioned problems of the prior art, one objective of the present invention provides an intelligent processing modulation system to solve the problems of the prior art.

In accordance with the foregoing objective, the present invention provides an intelligent processing modulation system comprising: a processing equipment, a detector, a data storage, a basic database, a mode database and a processing information manager. The processing equipment processes at least one raw material into a product, the detector detects wear and tear of the processing equipment and detects at least one condition of the environment in which the processing equipment is being placed before the process begins. The data storage records at least one specification of the raw material being used, at least one ingredient of the raw material, at least one processing parameter of the raw material and at least one method for processing the raw material. Every time the processing equipment processes the raw material into the product, the basic database stores first information of the detector corresponding to the product, second information of the data storage corresponding to the product and a condition of the product transmitted through the processing equipment. The mode database then receives the first information of the detector, the second information of the data storage and third information of the basic database, sets up a processing model accordingly and records a defect condition of the product and a yield condition of the product for each time the process for processing the raw material is completed. The processing information manager receives parameter information of the processing model of the mode database, and connects to the processing equipment. The processing equipment operates and processes the raw material according to the information received by the processing information manager and repeats the foregoing process in which the processing equipment transmits the information corresponding to the product to the basic database such that the basic database stores much information of the product for conveniently comparing the defect condition of the product. When the product has more defects, the processing information manager modifies the parameter information of the processing model promptly according to the parameter information of the processing model corresponding to the product having fewer defects in the mode database, and the processing equipment operates accordingly to obtain the product having fewer defects.

Preferably, the intelligent processing modulation system may further comprise an input interface. Engineers input the specification and the ingredient of the raw material through the input interface or vendors transmit the specification and the ingredient of the raw material to the input interface through a communication link, modify or choose the processing parameter and the method for processing the raw material and transmit the processing parameters and the methods for processing the raw material to the data storage.

Preferably, the intelligent processing modulation system may further comprise a product exterior inspector and a product interior inspector. The product exterior inspector and the product interior inspector respectively obtain an external product inspecting result and an internal product inspecting result by an inspecting mechanism.

Preferably, the inspecting mechanism may be one of the current-type image detecting machines, a surface stress detecting machine, a camera, an infrared scanning machine, an ultrasonic scanning machine, a laser scanning machine, an x-ray scanning machine, a permeability detecting machine, an internal stress detecting machine, a magnetic particle detecting machine, and a spectrometer.

Preferably, the intelligent processing modulation system may further comprise an online analyzer. The online analyzer judges whether the defect condition of the product is of low defect density or high defect density according to the external product inspecting result and the internal product inspecting result, records the first information and the second information corresponding to the defect condition of the product and further marks the first information and the second information as low defect density information or high defect density information, and generates feedback of the defect condition of the product, the first information corresponding to the product and the second information corresponding to the product to the basic database.

Preferably, the intelligent processing modulation system may further comprise an electrical property meter measuring the conductivity of the product and generating feedback to the basic database.

Preferably, the intelligent processing modulation system may further comprise a model modifier building up and training the processing model and building up a modification model according to the conductivity of the product and the external product inspecting result and the internal product inspecting result of the product generated for each time the process for processing the raw material is completed.

Preferably, the intelligent processing modulation system may further comprise a problem analyzer analyzing an operational problem of the processing equipment according to the first information, the second information and the third information corresponding to the product.

Preferably, the mode database may simplify the process of the processing model according to the conductivity of the product or the external product inspecting result and the internal product inspecting result of the product generated for each time the process for processing the raw material is completed.

In accordance with the foregoing objective, the present invention provides an intelligent processing modulation method comprising: (1) applying a detector detecting wear and tear of a processing equipment and detecting at least one condition of an environment in which the processing equipment being placed before a process for processing a raw material into a product begins; (2) applying a data storage recording at least one specification of the raw material, at least one ingredient of the raw material and at least one processing parameter of the raw material and at least one method for processing the raw material; (3) applying the processing equipment to perform the process; (4) applying a basic database storing first information of the detector corresponding to the product, second information of the data storage corresponding to the product and a condition of the product for each time the process is completed; (5) applying a mode database receiving the first information of the detector, the second information of the data storage and third information of the basic database, the mode database setting up a processing model accordingly and recording a defect condition of the product and a yield condition of the product generated for each time the process is completed; (6) applying a processing information manager receiving parameter information of the processing model of the mode database and connecting to the processing equipment; (7) transmitting, by the mode database, the parameter information of the processing model of the mode database to the processing information manager; the processing equipment operates according to information received by the processing information manager to process the raw material and transmits the first information of the detector corresponding to the product, the second information of the data storage corresponding to the product and the condition of the product to the basic database for each time the process is completed and the basic database stores the first information, the second information and the condition of the product; the mode database records the defect and a yield condition of the product generated for each time the process is completed; and when the product has more defects, the processing information manager modifies the parameter information of the processing model promptly according to the parameter information of the processing model corresponding to the product having fewer defects recorded in the mode database, and the processing equipment operates accordingly to obtain the product having fewer defects.

In accordance with the above description, the intelligent processing modulation system and method of the present invention have one or more of the following:

(1) The intelligent processing modulation system of the present invention modifies the parameter information of the processing model promptly so as to reduce the probability of producing a defective product and increase the yield rate of the product.

(2) The intelligent processing modulation system of the present invention modifies the parameter information of the processing model to improve the product quality by analyzing the product exterior inspector, the product interior inspector, the online analyzer and the electrical property meter.

DETAILED DESCRIPTION OF THE PREFERRED EMBODIMENTS

The advantages, features and technical methods of this invention will be described in detail in order to be understood easier. Moreover, the present invention may be realized in different form and should not be limited to the embodiments described here. On the contrary, the provided embodiments make the disclosure more clear and define the scope of this invention entirely and completely. Further, the present invention is only defined according to the attached claims.

Figure 1:
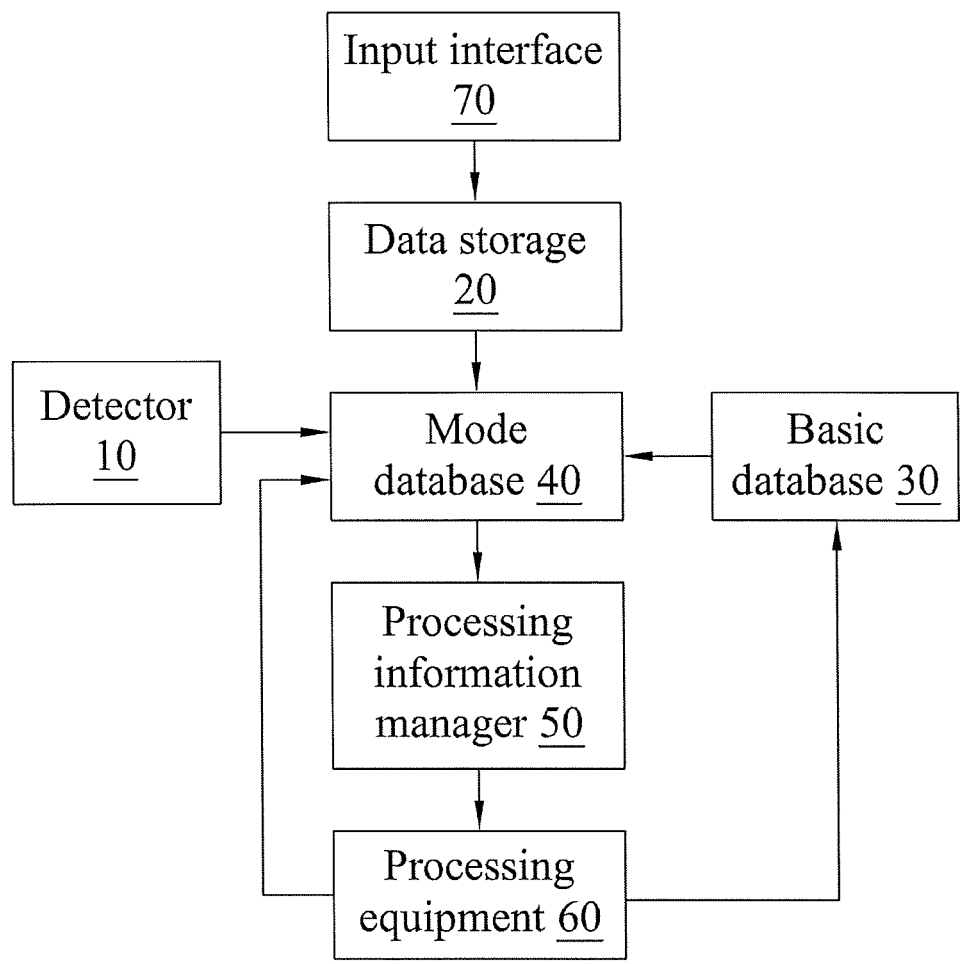
FIG. 1 depicts the block diagram of the first embodiment of the intelligent processing modulation system and method of the present invention.
Figure 2:
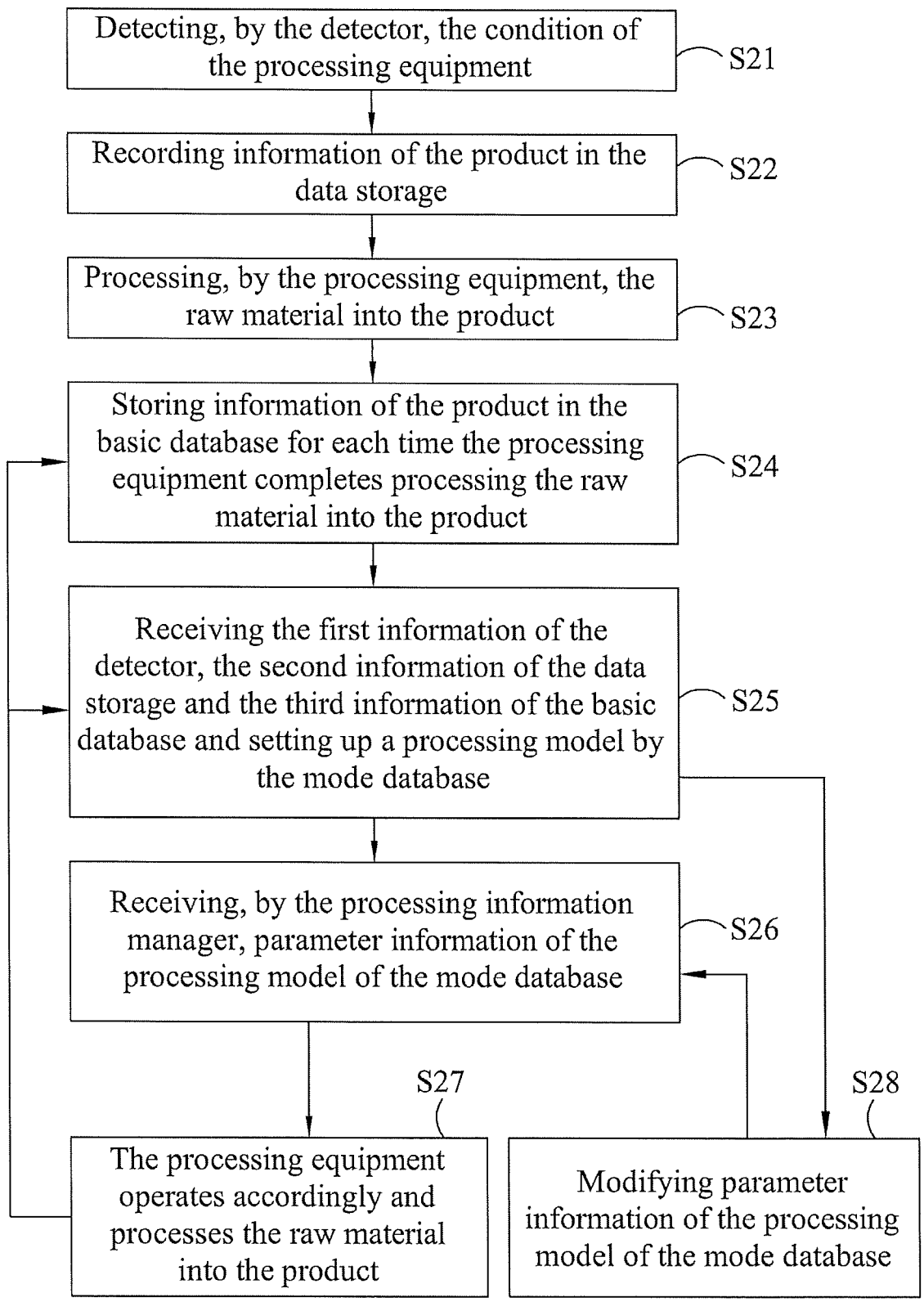
FIG. 2 depicts the flow chart of the first embodiment of the intelligent processing modulation system and method of the present invention.

Refer to FIG. 1 and FIG. 2, which are respectively the block diagram and the flow chart of the intelligent processing modulation system and method of the first embodiment of the present invention. To begin with, the intelligent processing modulation system is described. The system comprises the processing equipment 60, the detector 10, the data storage 20, the basic database 30, the mode database 40 and the processing information manager 50. The processing equipment 60 performs a process for processing at least one raw material into at least one product. The detector 10 detects wear and tear of the processing equipment 60 and detects at least one condition of the environment in which the processing equipment 60 is placed before the process begins. The data storage 20 records at least one specification of the raw material, at least one ingredient of the raw material and at least one processing parameter of the raw material and at least one method for processing the raw material. For each time the processing equipment 60 has completed processing the raw material into a product, the processing equipment 60 transmits the first information of the detector 10, the second information of the data storage 20 corresponding to the product and the condition of the product to the basic database 30, where the first information, the second information and the condition of the product are stored. Then, the mode database 40 receives the first information of the detector 10, the second information of the data storage 20 and the third information of the basic database 30. The mode database 40 sets up the processing model according to the first, second and third information and records the defect condition of the product and yield condition of the product generated for each time the process for processing the raw material is completed. The processing information manager 50 receives the parameter information of the processing model of the mode database 40 and connects to the processing equipment 60. The processing equipment 60 operates according to the information received by the processing information manager 50 to process the raw material and simultaneously repeats the foregoing process in which the processing equipment 60 transmits the information corresponding to the product into the basic database 30 such that the basic database 30 has much information relating to the product which will benefit the judgment about the amount of defects. When the product has more defects, the processing information manager 50 modifies the parameter information of the processing model promptly according to the parameter information of the processing model corresponding to the product having few defects in the mode database 40, and the processing equipment 60 operates accordingly to obtain a product having few defects and improves the yield rate of the product.

Besides, engineers may input the specifications and the ingredients of the raw material through the input interface 70 or vendors may transmit the specifications and the ingredients of the raw material to the input interface 70 through a communication link, modify or choose the processing parameters and the method for processing the raw material and transmit the processing parameters and the method for processing the raw material to the data storage 20. That is, the present disclosure provides a convenient way to manually input the processing parameters and methods of the previous product having fewer defects and further reduce the probability of making a mistake. Similarly, vendors may also speed up the transmission and avoid human errors by the way of interior transmission.

Moreover, the method of the present invention comprises: (1) S21: apply the detector 10 to detect the condition of the processing equipment 60 including wear and tear of the processing equipment 60 and at least one condition of the environment in which the processing equipment 60 is placed before the process for processing the raw material begins. The condition of the environment may be information regarding the temperature and the humidity of the environment in which the processing equipment 60 is placed. (2) S22: apply the data storage 20 to record at least one specification of the raw material, at least one ingredient of the raw material and at least one processing parameter of the raw material and at least one method for processing the raw material. (3) S23: apply the processing equipment 60 to process at least one raw material into at least one product. (4) S24: apply the basic database 30 to store the first information of the detector 10 corresponding to the product, the second information of the data storage 20 corresponding to the product and the condition of the product for each time the processing equipment has completed processing the raw material into the product. (5) S25: apply the mode database 40 to receive the first information of the detector 10, the second information of the data storage 20 and the third information of the basic database 30. The mode database 40 sets up a processing model according to the first, second and third information and records a defect condition of the product and a yield condition of the product generated for each time the process for processing the raw material is completed. (6) S26: apply the processing information manager 50 to receive parameter information of the processing model of the mode database 40 and connects to the processing equipment 60. (7) S27: transmit the parameter information of the processing model of the mode database 40 to the processing information manager 50. The processing equipment 60 operates according to the information received by the processing information manager 50 to process the raw material and simultaneously transmits the first information of the detector 10 corresponding to the product, the second information of the data storage 20 corresponding to the product and the condition of the product to the basic database 30 and the basic database 30 stores the first information, the second information and the condition of the product. (8) S28: when the product has more defects, the processing information manager 50 modifies the parameter information of the processing model promptly according to the parameter information of the processing model corresponding to the product having fewer defects recorded in the mode database 40. Repeat step S27 in which the processing equipment 60 operates and processes the raw material according to the information received by the processing information manager 50. In this way, products having fewer defects may be obtained. The foregoing method may also be applied in other equipment, such as a grinding machine and a sputtering machine, and is not limited to a specific industry field.

Figure 3:
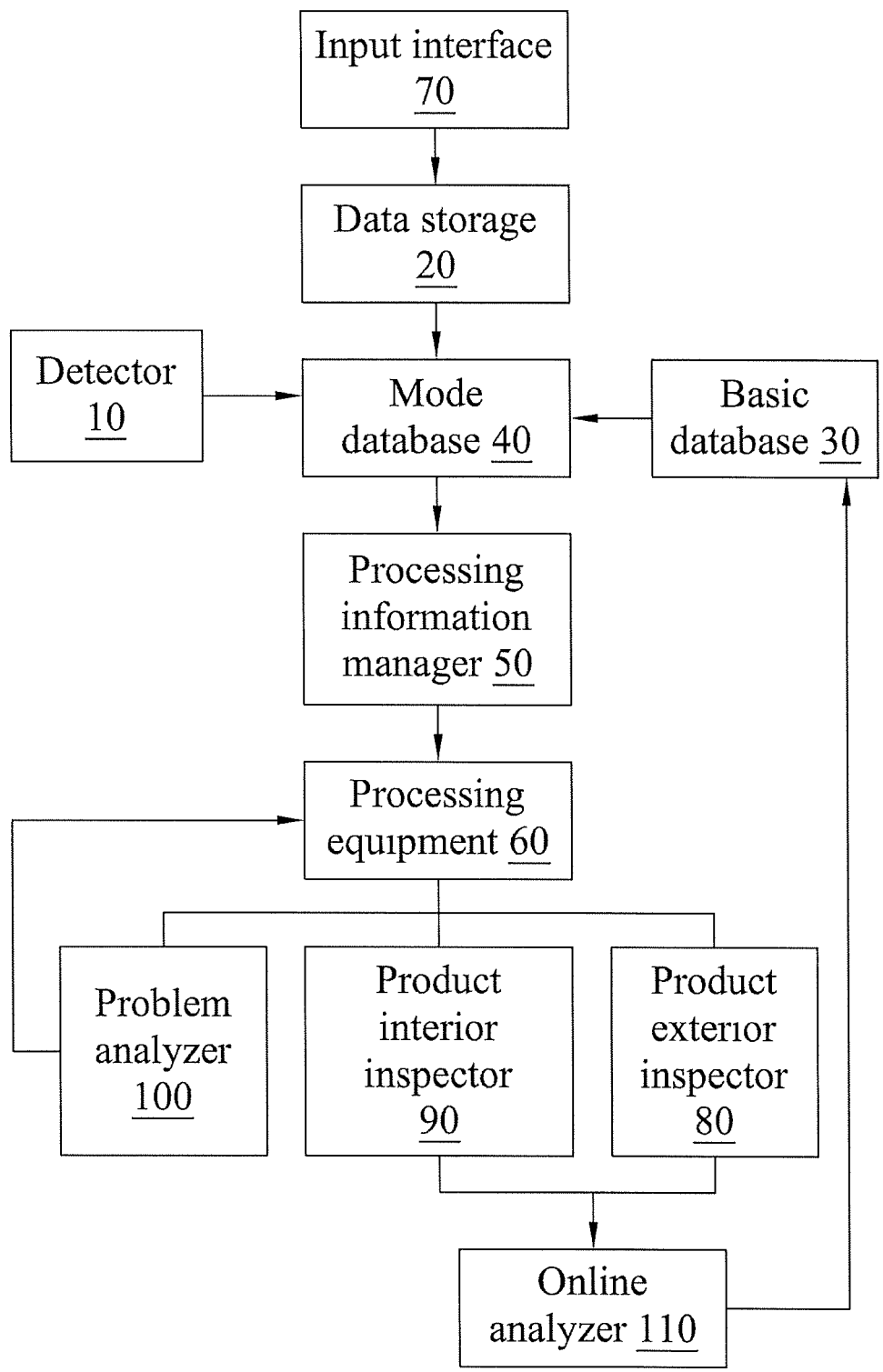
FIG. 3 depicts the block diagram of the second embodiment of the intelligent processing modulation system and method of the present invention.

Please refer to FIG. 3, which is the block diagram of the second embodiment of the intelligent processing modulation system and method of the present invention. In the present embodiment, the elements in FIG. 3 and the elements having the same symbol in FIG. 1 have a similar configuration. The similar configuration will not be repeatedly described here.

The intelligent processing modulation system further comprises the product exterior inspector 80, the product interior inspector 90 and the online analyzer 110. The product exterior inspector 80 and the product interior inspector 90 respectively obtain the external product inspecting result and the internal product inspecting result by the inspecting mechanism for each time the processing equipment 60 has completed processing the raw material into the product. Moreover, the inspecting mechanism may be one of a current-type image detecting machines, a surface stress detecting machine, a camera, an infrared scanning machine, an ultrasonic scanning machine, a laser scanning machine, an x-ray scanning machine, a permeability detecting machine, an internal stress detecting machine, a magnetic particle detecting machine, and a spectrometer. For different products and different detecting techniques, the external product inspecting result may be one of flatness, appearance, and/or ductility of the product and the internal product inspecting result may be one of the internal defects of degree, penetration, absorption, and/or reflection of the product. The measurement ranges of the external product inspecting result and the internal product inspecting result are not limited. The online analyzer 110 judges whether the defect condition of the product is of low defect density or high defect density according to the external product inspecting result and the internal product inspecting result. The online analyzer 110 records the first information and the second information corresponding to the defect condition of the product and further marks the first information and the second information as low defect density information or high defect density information. The online analyzer 110 eventually generates feedback of the defect condition of the product, the first information corresponding to the product and the second information corresponding to the product to the basic database 30. The first information and the second information collected in the above steps help the engineers to analyze and improve the processing parameters.

Besides, every time the processing equipment 60 processes the raw material into the product, the problem analyzer 100 analyzes the operational problems of the processing equipment 60 according to the first information, the second information and the third information corresponding to the product so as to search for the breakdown point and the key problem of the processing equipment 60 and smoothen the processing process.

Figure 4:
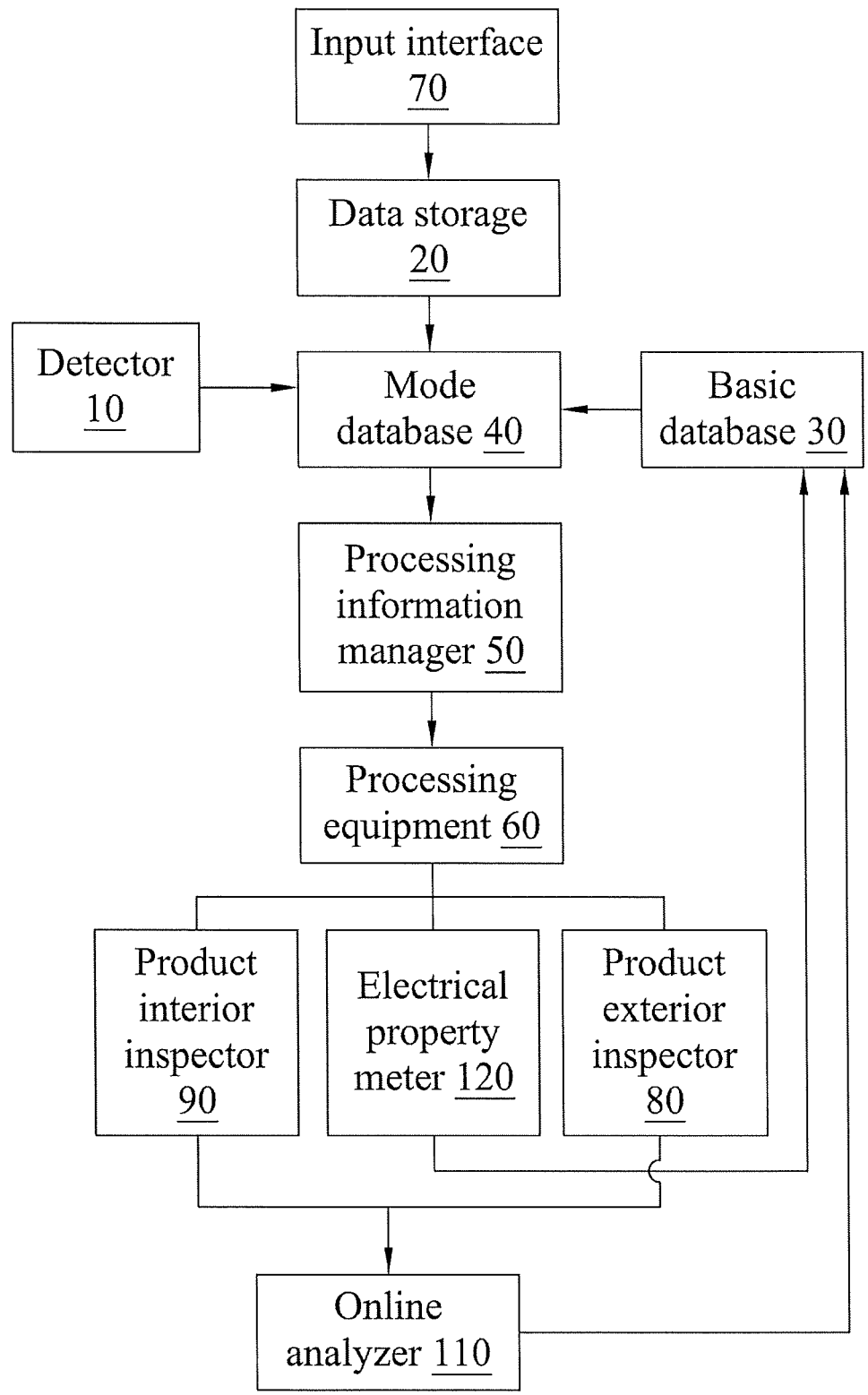
FIG. 4 depicts the block diagram of the third embodiment of the intelligent processing modulation system and method of the present invention.

Please refer to FIG. 4, which illustrates the block diagram of the third embodiment of the intelligent processing modulation system of the present invention. In the present embodiment, the elements in FIG. 4 and the elements having the same symbol in FIG. 1 have similar configuration. The similar configuration will not be repeatedly described here.

The intelligent processing modulation system further comprises the model modifier 130. For each time the processing equipment 60 has completed processing the raw material into the product, the online analyzer 110 judges the defect condition of the product is a high defect density according to the external product inspecting result and the internal product inspecting result. According to the judgment of the external product inspecting result, the internal product inspecting result and the online analyzer 110, the model modifier 130 accordingly builds up and trains the processing model and builds up the modification model. When the product is a high defect density again, a new processing model may be built up according to the modification model. Besides, the information of the processing parameter may be modified to improve the yield rate of the product. Moreover, the intelligent processing modulation system further comprises the electrical property meter 120 analyzing the processing products of the electrical type, measuring the conductivity of the product and transmitting the conductivity as feedback to the basic database 30 to benefit the electrical analysis of the product by engineers. The model modifier 130 also modifies the information of the processing parameters and the processing model according to the conductivity of the product to avoid producing the product having low conductivity. Furthermore, the mode database 40 simplifies the process of the processing model according to the external product inspecting result, the internal product inspecting result or the conductivity of the product. In this way, unnecessary processes are avoided, the production process becomes faster and the process of the processing model is simplified.

In summary, the processing information manager 50 modifies the parameter information of the processing model for each time the processed product has more defects to avoid other products having many defects. The input interface 70 allows engineers to appropriately modify the processing parameters and delete the processing parameters leading to the product having many defects. The product exterior inspector 80, the product interior inspector 90, the online analyzer 110 and the electrical property meter 120 produce many external product inspecting results, internal product inspecting results, defect results of the product and the conductivity of the product to benefit the analysis and improvement of the processing process. Besides, the problem analyzer 100 analyzes the operational problems of the processing equipment 60 and the model modifier 130 modifies the processing model such that the processing process and the yield rate of the product are improved. Consequently, the intelligent processing modulation system and method have the foregoing advantages, improve the yield rate of the product and reduce the number of the products having many defects.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Although the terms first, second, third, etc. may be used herein to describe various elements, components, loops, circuits, and/or modules, these elements, components, loops, circuits, and/or modules should not be limited by these terms. These terms may be only used to distinguish one element, component, loop, circuit or module from another element, component, loop, circuit or module. Terms such as "first," "second," and other numerical terms when used herein do not imply a sequence or order unless clearly indicated by the context. Thus, a first element, component, loop, circuit or module discussed below could be termed a second element, component, loop, circuit or module without departing from the teachings of the example implementations disclosed herein.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memory, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are non-volatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The above description is merely illustrative and not restrictive. Any equivalent modification or change without departing from the spirit and scope of the present disclosure should be included in the appended claims.

What is claimed is:

1. An intelligent processing modulation system, comprising:
    a processing equipment, performing a process for processing at least one raw material into at least one product;
    a detector, detecting wear and tear of the processing equipment and detecting at least one condition of an environment in which the processing equipment is placed before the process begins;
    a data storage, recording at least one specification of the raw material, at least one ingredient of the raw material and at least one processing parameter of the raw material and at least one method for processing the raw material;
    a basic database, storing first information of the detector corresponding to the product, second information of the data storage corresponding to the product and a condition of the product for each time the process is completed;
    a mode database, receiving the first information of the detector, the second information of the data storage and third information of the basic database, setting up a processing model accordingly and recording a defect condition of the product and a yield condition of the product for each time the process is completed; and
    a processing information manager, receiving parameter information of the processing model of the mode database and connecting to the processing equipment;
    wherein the mode database transmits the parameter information of the processing model to the processing information manager, the processing equipment operates according to information received by the processing information manager to process the raw material and transmits the first information of the detector corresponding to the product, the second information of the data storage corresponding to the product and the condition of the product to the basic database for each time the process is completed and the basic database stores the first information, the second information and the condition of the product, the mode database records the defect condition of the product and the yield condition of the product generated for each time the process is completed, and when the product has more defects, the processing information manager modifies the parameter information of the processing model promptly according to the parameter information of the processing model corresponding to the product having fewer defects in the mode database, and the processing equipment operates accordingly to obtain the product having fewer defects.

2. The system of claim 1, further comprises an input interface, receiving the specification and the ingredient of the raw material inputted by engineers or transmitted through a communication link by vendors, modifying or choosing the processing parameter and the method for processing the raw material and transmitting the processing parameter and the method for processing the raw material to the data storage.

3. The system of claim 1, further comprises a product exterior inspector and a product interior inspector, wherein the product exterior inspector and the product interior inspector respectively obtain an external product inspecting result and an internal product inspecting result by an inspecting mechanism.

4. The system of claim 3, wherein the inspecting mechanism is one of a current-type image detecting machine, a surface stress detecting machine, a camera, an infrared scanning machine, an ultrasonic a scanning machine, a laser scanning machine, an x-ray scanning machine, a permeability detecting machine, an internal stress detecting machine, a magnetic particle detecting machine, and/or a spectrometer.

5. The system of claim 3, further comprises an online analyzer, wherein the online analyzer judges whether the defect condition of the product is of low defect density or high defect density according to the external product inspecting result and the internal product inspecting result, records the first information and the second information corresponding to the defect condition of the product and further marks the first information and the second information as low defect density information or high defect density information, and generates feedback of the defect condition of the product, the first information corresponding to the product and the second information corresponding to the product to the basic database.

6. The system of claim 1, further comprises an electrical property meter measuring conductivity of the product and generating feedback to the basic database.

7. The system of claim 6, further comprising a model modifier building up and training the processing model and building up a modification model according to the conductivity of the product and the external product inspecting result and the internal product inspecting result of the product generated for each time the processing process of the product is completed.

8. The system of claim 1, further comprises a problem analyzer analyzing an operational problem of the processing equipment according to the first information, the second information and the third information corresponding to the product.

9. The system of claim 6, wherein the mode database simplifies the process of the processing model according to the conductivity of the product or the external product inspecting result and the internal product inspecting result of the product generated for each time the processing process of the product is completed.

10. An intelligent processing modulation method comprising:

detecting, by a detector, wear and tear of a processing equipment and detecting at least one condition of an environment in which the processing equipment is placed before a process for processing a raw material into a product begins;

recording in a data storage at least one specification of the raw material, at least one ingredient of the raw material and at least one processing parameter of the raw material and at least one method for processing the raw material;

applying the processing equipment to perform the process;

storing, in a basic database, first information of the detector corresponding to the product, second information of the data storage corresponding to the product and a condition of the product for each time the process is completed;

receiving, by a mode database, the first information of the detector, the second information of the data storage and third information of the basic database, and setting up a processing model accordingly and recording a defect condition of the product and a yield condition of the product for each time the process is completed;

receiving, by a processing information manager, parameter information of the processing model of the mode database and connect to the processing equipment; and transmitting, by the mode database, the parameter information of the processing model of the mode database to the processing information manager, with the processing equipment operating according to information received by the processing information manager to process the raw material and the processing equipment transmitting the first information of the detector corresponding to the product, the second information of the data storage corresponding to the product and the condition of the product to the basic database for each time the process is completed and the basic database storing the first information, the second information and the condition of the product, the mode database records the defect condition of the product and the yield condition of the product generated for each time the process is completed, and when the product has more defects, the processing information manager modifies the parameter information of the processing model promptly according to the parameter information of the processing model corresponding to the product having fewer defects recorded in the mode database, and the processing equipment operates accordingly to obtain the product having fewer defects.

* * * * *